FLUID-OPERATED SHIFT REGISTER

Filed Dec. 19, 1963 2 Sheets-Sheet 1

INVENTOR.
HAROLD R. GRUBB

BY K. P. Johnson
ATTORNEY

United States Patent Office 3,250,470

Patented May 10, 1966

3,250,470
FLUID-OPERATED SHIFT REGISTER

Harold R. Grubb, Owego, N.Y., assignor to International Business Machines Corporation, New York, N.Y., a corporation of New York Filed Dec. 19, 1963, Ser. No. 331,810
7 Claims. (Cl. 235—201)

The present invention relates generally to bistable fluid-operated devices and more particularly to an arrangement of these devices interconnected with each other to provide a shift register for digital computing equipment.

Bistable fluid devices are known in the art in which a main or power stream can be displaced from one to the other of a pair of outlet ports by a fluid control stream directed transversely against the power stream as the latter issues from its nozzle. By properly arranging the channels connecting the power stream nozzle with each of the outlet ports, the main stream can be made to adhere to one or the other of the channel walls once deflected thereto by a control stream. The devices are thus particularly useful in computing equipment because of the bistable characteristic of these devices generally known as fluid amplifiers. These fluid amplifiers are particularly useful in computing equipment wherein the respective outlet ports may be arbitrarily assigned 0 and 1 values in the binary code. The port through which the power stream is flowing may then be said to indicate either a 0 or 1 depending upon the presence or absence of the power stream therefrom. The particular application with which the present invention is concerned is the use of fluid amplifiers to provide a shifting register for digital information. Heretofore, shift registers of this type have employed a pair of bistable fluid devices for each stage in the shift register. One device serves as the prime storage unit, while the second device is used to temporarily store the information from the first device during the shifting of information from one stage to the succeeding stage. Because of this arrangement two sets of shift pulses are required, one for each of the two devices in a stage thus increasing the amount of interconnection between devices in a stage and between stages to make the known shift registers relatively complicated and expensive.

Accordingly, it is a primary object of this invention to provide a fluid-operated shift register requiring only a single bistable device for each stage.

Another object of this invention is to provide a shift register employing a single fluid-operated bistable device per stage that is of less complexity and cost than known devices.

Another object of this invention is to provide a shift register having a single fluid-operated bistable device per stage which operates with improved efficiency and decreased switching time.

Yet still another object of this invention is to provide a multi-stage shift register employing a single bistable fluid-operated device per stage which can be selectively controlled to shift stored information in either a forward or reverse direction through the stages.

Yet another object of this invention is to provide a multi-stage shift register having a series of bistable fluid-operated devices into which information bits may be entered serially or in parallel.

In the attainment of the foregoing objects, the invention provides a shift register comprised of a plurality of bistable fluid devices connected in cascade, with each adapted to maintain the issuance of a fluid power stream from either of two outlet ports in first or second stable states in response to input fluid control signals thereto for indicating the presence or absence of an information bit. The outlet ports of each device are interconnected with the succeeding device through gating means which provide an appropriate fluid input control signal to the succeeding device whereby the latter issues its power stream from a corresponding port upon the coincidence of a fluid timing pulse with the output stream from the preceding device. All bistable devices in the shift register also have means by which they can be reset to a common stable state and means for setting a selected one or ones in an opposite stable state for the initial storage of information bits.

The foregoing and other objects, features and advantages of the invention will be apparent from the following more particular description of preferred embodiments of the invention, as illustrated in the accompanying drawings in which.

Figure 1:
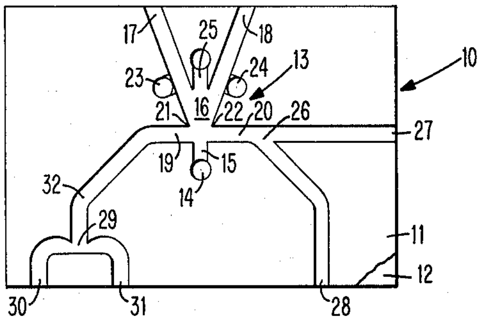
FIGURE 1 is an enlarged plan view of one stage in the shift register of the invention illustrating the bistable device thereof in conjunction with the arrangement of fluid conduits for controlling the stable states assumed by the device.

Referring now to FIG. 1 there is illustrated a device 10 that is used as the first stage of a shift register in which information bits can be shifted from left to right. The device 10 is preferably formed by two superimposed planar sheets 11, 12 of material such as ceramic or plastic which can be molded or shaped to form the necessary channels therein. It may be assumed for this device and those of the following apparatus that a pair of transparent sheets of plastic are used with the channels formed in the bottom sheet. The device 10 comprises a fluid amplifier, generally designated 13 having an inlet port 14 through which a pressurized fluid is supplied to a nozzle 15 so that a power stream of fluid continuously flows into chamber 16. The chamber communicates with a pair of output channels 17, 18 through either of which the power stream may issue and to which may be connected suitable tubing to carry the power stream to other fluid devices. A pair of control ports or nozzles 19, 20 are disposed on either side of power stream nozzle 15 from which fluid control pulses selectively issue to deflect the power stream to an outlet channel. A control pulse from nozzle 20 deflects the power stream to channel 17 so that the amplifier is said to be "off," indicating a binary "0" output. A control pulse from nozzle 19 deflects the stream to channel 18 so that the amplifier is "on," indicating a binary "1." Each wall 21, 22 adjacent its respective nozzle 19, 20 is set back from nozzle 15 so that when the power stream is deflected to one of the walls, it will "lock on" because of a low pressure turbulence region at the offset. The power stream will remain attached to a wall without continuing the control stream and thus have two stable flow conditions. Exhaust ports 23, 24 and center port 25 are connected to a low pressure sump or atmosphere to relieve excess back pressure and prevent inadvertent switching if the power stream encounters increased impedance in an output channel. When a control pulse occurs, the low pressure turbulent region is destroyed along the wall adjacent the activated control port and the power stream is deflected to the opposite wall and output channel.

Control pulses supplied to ports 19 and 20 for power stream switching may be required in response to any one of a plurality of conditions or in response to a combination of conditions. Such control of the power stream is attained by providing respective logical "OR" and "AND" junctions in the channels communicating with the control ports. An "OR" junction 26 is formed by directing multiple input passages into a common outlet passage such that fluid in either input passage will not flow out through another input passage with any substantial pressure or quantity. This is shown by the junction 26 of passages 27 and 28.

The "AND" junction is illustrated at 29 where passages 30 and 31 communicate in opposition and a passage 32 is provided perpendicular thereto. A fluid pulse present at either passage 30 or 31 is ineffective to provide a pulse in passage 32, but if both passages 30 and 31 have pulses present in opposition, then an output pulse is provided in channel 32 because of the pressure increase at the junction. The AND junction requires the coincident manifestation of two conditions before an output pulse is generated. The arrangement of AND junctions can obviously be modified to require the presence of more than two concurrent pulses, as desired. Although only one OR and one AND junction have been shown in device 10, it will be seen that additional ones of these logic junctions may be used in other stages of the shift register of the invention.

Figure 2:
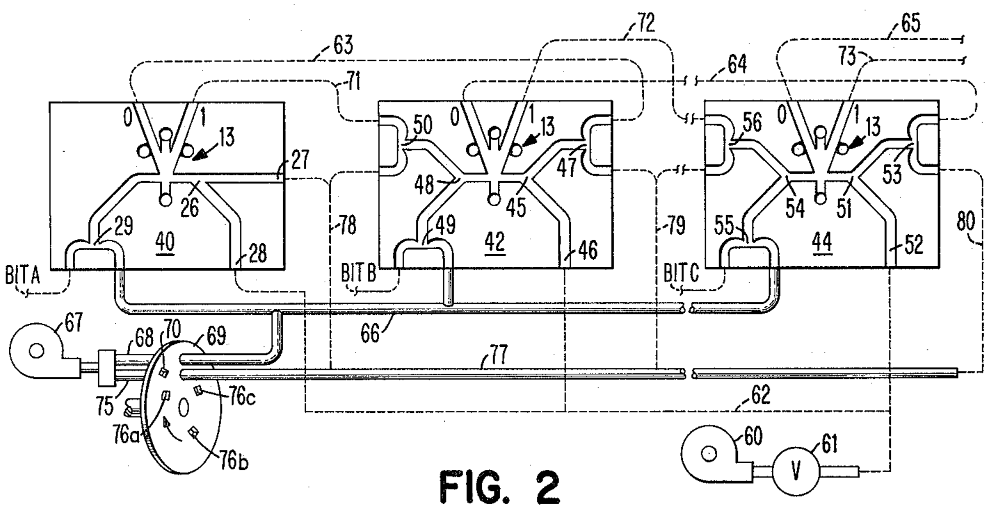
FIGURE 2 is a plan view of one embodiment of the shift register of the invention illustrating the fluid interconnections between stages and control pulse source therefor.

In FIG. 2, there is shown a fluid-operated binary shift register constructed in accordance with the invention. The shift register shown has three stages, although more stages may be added as required. The shift register comprises stages 40, 42 and 44, with each stage including a fluid amplifier 13 in which the left output channel of each is designated a "0" binary output and the right output channel is designated the "1" binary output when the power stream issues respectively therefrom. Amplifier 13 of stage 40, identical to FIG. 1, has the "0" input control port connected to OR 26 and is adapted to be switched to the "0" state when a fluid pressure pulse is applied to either of input channels 27, 28. The "1" input control port of the fluid amplifier is connected to AND junction 29 and is adapted to be switched to the "1" state when both inputs to the AND are supplied with coincident fluid pulses.

Second stage 42 has the "0" control port of its amplifier connected to OR junction 45 and is switched to the "0" state by a fluid pulse in channel 46 or by a pulse from AND junction 47. The "1" control port of stage 42 is connected to OR junction 48 so that the amplifier provides a power stream from its "1" output channel when a pulse occurs from either of AND junctions 49 or 50.

In third stage 44, identical to stage 42, the fluid amplifier thereof has its "0" control port connected to OR junction 51 so that stage 44 is switched to the "0" output state when a pulse issues from either input channel 52 or AND junction 53. The "1" control port is connected to OR junction 54 and stage 44 is switched to indicate a "1" state whenever a fluid pulse issues from either of AND junctions 55 or 56.

Each of the stages 40, 42 and 44 are provided with interconnecting ducts or tubing indicated in the figure by dotted lines in order to simplify the drawing. The ducts transmit the various pulses from control devices and between stages. A suitable reset pulse source 60, such as a pump, is connected through a selectively operable valve 61, which may, for example, be manually or electromechanically operated, that is connected to duct 62. Duct 62 is coupled with each of input channels 28, 46 and 52 so that when valve 61 is opened, a "0" input pulse is supplied concurrently through these OR junctions to deflect the power stream of each of the stages to the "0" output channels. The "0" output from stage 40 is coupled as one input via duct 63 to AND junction 47; the "0" output from stage 42 is coupled via duct 64 as one input to AND junction 53 of stage 44; and the "0" output of stage 44 is supplied via duct 65 to another shift register stage or utilization device.

Information bits are initially stored in the shift register stages either in parallel or serially. Input information bits are entered in parallel through AND junctions 29, 49 and 55 of the respective stages by selectively pulsing bit ducts A, B or C with fluid pulses in conjunction with a "set" pulse supplied along duct 66 at the second input of each of the AND junctions. The set pulses may be generated by any suitable means, such as that shown which comprises a pump 67 supplying pressurized fluid along duct 68 to an apertured disc 69. The disc may be rotated at a constant velocity and is provided with an aperture 70. When the aperture passes in alignment with duct 68, a fluid pulse is generated via duct 66 at each AND junction 29, 49 and 55. If there is a concurrent bit pulse, A, B or C, present at any of the AND junctions, the power streams in the corresponding stage amplifiers are deflected from the reset "0" output channel to the "1" channel where the stream remains, indicating the presence of a bit therein. The "1" output channel from register stage 40 is supplied via duct 71 to one input of AND junction 50 of the succeeding stage; the "1" output from stage 42 is coupled via duct 72 as one input to AND junction 56 of register stage 44; and the "1" output of stage 44 is supplied along duct 73 to another stage or utilization device.

When data is to be entered serially in the shift register, a bit pulse is selectively applied as desired only at stage 40. If the bit and set pulses coincide at AND junction 29, the power stream of the amplifier is deflected to the "1" output.

In order to shift the stored data bits from one stage to the succeeding stage, there are provided shift or timing pulses. These pulses may recur regularly or only when an information shift is required. Information readout is usually required on a regular, timed basis so that recurring pulses are shown in the description. The timing pulses may also be obtained from disc 69 by supplying pressurized fluid from source 67 through duct 75 so that as the disc revolve apertures 76*a*, 76*b* and 76*c* each produce a fluid pulse in duct 77. Tap off ducts 78, 79 and 80 provide the timing pulses as common gating signals at various logic junctions. Duct 78 supplies timing pulses to the input 27 of OR junction 26 at stage 40, and to one input of AND junction 50 at stage 42. Duct 79 provides timing pulses to one input each of AND junctions 47 and 56 at respective stages 42 and 43. Duct 80 supplies timing pulses to AND junction 53 of stage 44.

When an output signal is present from a preceding register stage, in coincidence with a timing pulse at one of the AND junctions, a control pulse is generated which will switch the power stream therein to the output channel corresponding to the activated one of the preceding stage. For example, if the power stream from stage 40 is flowing in duct 71 to the input of AND junction 50, when a timing pulse occurs, a control pulse will be transmitted through OR junction 48 to provide a control pulse to deflect the power stream in stage 42 to the "1" output duct thereof.

Figure 3:
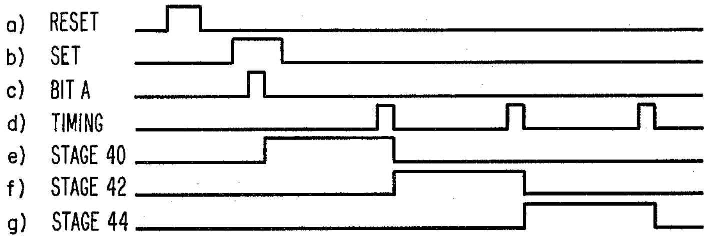
FIGURE 3 is a timing diagram for the shift register shown in FIG. 2.

The operation of the shift register in FIG. 2 will be described with reference to the timing diagram of FIG. 3. Before entering information in any stage, a reset pulse (FIG. 3*a*) is supplied in duct 62 which is applied to reset channels 28, 46 and 52 of the respective register stages 40, 42 and 44. The reset pulse transfers the power stream from the "1" output channel of the stage to the "0" output channel thereof, if not already so positioned. After resetting the stages, disc 69 is revolved in a clockwise direction from the position shown. The first aperture 70 will provide a set pulse in duct 66 at AND junctions 29, 49 and 55. If any bit pulse A, B or C is also present at the other inputs to these AND junctions, their coincidence with the set pulse will provide a pulse at the respective "1" control port, deflecting the power stream to the "1" output channel. Assuming that only the "Bit A" duct supplies a pulse concurrently with the set pulse (FIGS. 3*b* and 3*c*), the power stream of stage 40 is transferred to the "1" output (FIG. 3*e*) so that a fluid stream is flowing in duct 71 to AND junction 50. With no other stages so transferred, the power streams thereof will be flowing in ducts 64 and 65. Upon further rotation of disc 69, aperture **76*a*** provides a timing pulse (FIG. 3*d*) which appears as a simultaneous input from duct 77 channel 27 at stage 40, which deflects the power stream from the "1" output channel to "0" output channel thereof (FIG. 3*e*). The same timing pulse also appears as one input to AND junction 50 and, with the stream flowing in duct 71 from stage 40, is operable to provide a control pulse effective to deflect the power stream from the "0" to the "1" output channel of stage 42 (FIG. 3*f*).

Because of fluid stream inertia in channel 71 and the same timing pulse at each stage, an effective control pulse is generated to switch the stream in stage 42 as the output in duct 71 disappears. Thus, in a fluid amplifier shift register a data bit may be shifted from one stage to the next without a temporary storage stage. The timing pulse in duct 77 also appears at AND junctions 47 and 56, but with no effect because ducts 63 and 72 do not have a fluid stream flowing therein during the presence of the timing pulse. However, the AND junction 53 of stage 44 is effective with a timing pulse in duct 80 to provide a control pulse through OR junction 51. The power stream stage 44 was already flowing in the "0" output channel thereof so that no change occurred. Duct 65 still has fluid flow therein at the end of the first timing pulse. The timing pulse used in the fluid shift register must end before the transferred power streams in any stage reach full flow in the new channel. At the end of the first timing pulse, a "0" is indicated in stage 40, a "1" is indicated in stage 42, and a "0" is indicated in stage 44, so that the original "A" bit has been transferred to the second stage by a single timing pulse.

When the second timing bit occurs, no change takes place in first stage 40 since a "0" is already indicated. A single input to AND 50 at second stage 42 is ineffective to provide a control pulse, but both inputs at AND 47 are present since duct 63 has flow therein. As a result the power stream in stage 42 is transferred to the "0" output channel. The output from stage 42 before transfer was flowing in duct 72 which was combined with a timing pulse at junction 56. This provides a "1" control pulse at the third stage 44 to deflect the power stream to output duct 73 (FIG. 3*g*). Upon the occurrence of the third timing pulse, the third stage is switched to the "0" state. All stages will be in the "0" stage and the "A" bit has passed through the stages with successive timing pulses. It will be noted that additional bits can be added in combination with set pulses during shifting, if so desired, or that other bits could have been added in parallel before shifting occurred.

Figure 4:
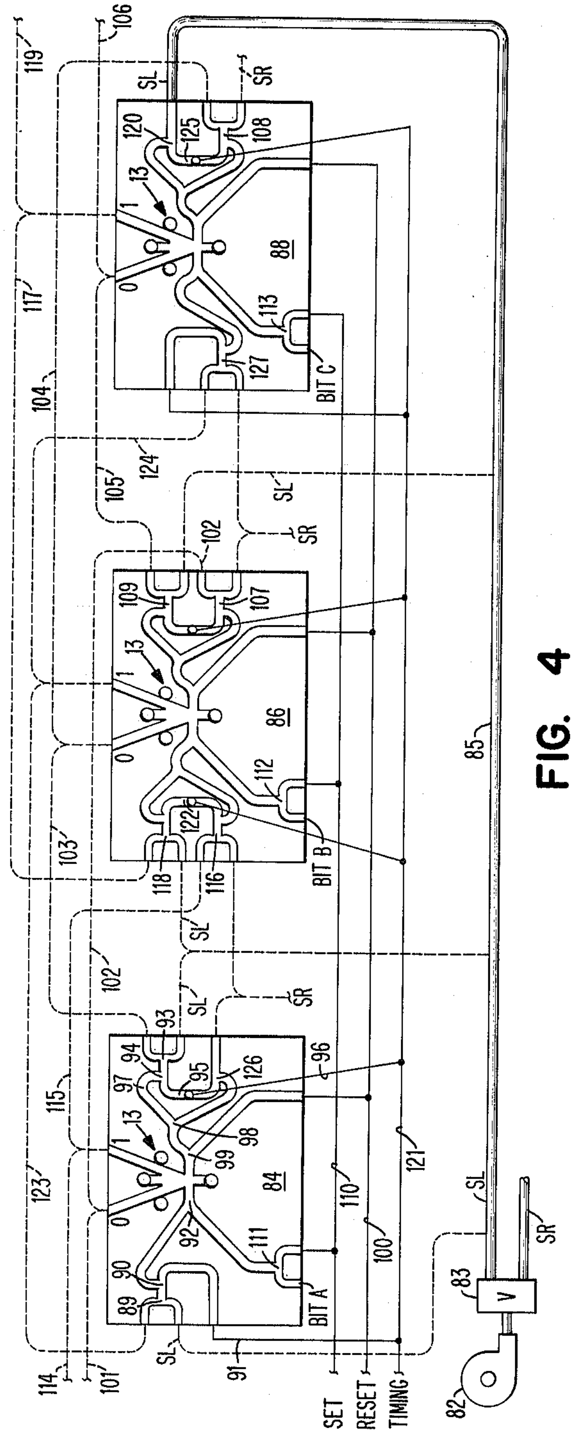
FIGURE 4 is a plan view of a second embodiment of the invention having fluid interconnections between stages to prevent information transfer in either direction therethrough.

The shift register described above may be modified to provide a shift register capable of shifting data bits either to the right or left, as shown in FIG. 4. The various stages require additional fluid logic junctions and additional shifting direction control signals. Referring to FIG. 4, each of the three stages 84, 86 and 88 have added logic but, because of the similarity of the stages, only the differences of the first stage over the shift register in FIG. 2 will be described in detail.

Each power stream issuing from the fluid amplifier 13 at either the "0" or "1" output channels is divided into two paths since the data bits may be required for transfer or utilization in either the right or left directions. Additionally, there are provided signals from a controlled pressure source 82 as by a selectively operable value 83 or another fluid amplifier, which determine the direction of information shift, either for shifting right (SR) or shifting left (SL). The SR or SL signals are supplied to each register stage. The first stage 84 also includes 3-way AND junctions actually comprising two 2-way AND junctions in series, such as junctions 89, 90. Junction 89 requires an SL signal as one input and the "1" output from the succeding stage 86. When these two outputs are present, one input is provided at junction 90. When the remaining input from a timing pulse source (not shown) is supplied in duct 91, a "1" control pulse is provided through OR junction 92. The 3-way coincidence function may also be obtained in slightly different manner as shown at the right side of stage 84. Here AND junction 93 is the same as junction 89; junction 94 receives one injut pulse from junction 93 and the other occurs when a timing pulse is provided in passageway 95 through duct 96 and a port normal to the passageway. When no timing pulse is present in duct 96, the output of junction 93 merely flows along passageway 95. However, a timing pulse in duct 96 increases the impedance in the passageway causing a "0" control pulse to be produced in channel 97 which flows through OR junctions 98, 99 to switch the power stream. Also, if an SR pulse occurs in passageway 95 in conjunction with a timing pulse in duct 96, a "0" control pulse will be generated through the other input to OR junction 98. The remaining stages 86 and 87 have similar AND junctions in slightly different arrangements, but their operation will be readily understood from the above description of stage 84.

The operation of the bi-directional shift register will now be described. As with the shift register of FIG. 2, a reset pulse (FIG. 5*a*) is supplied on line 100 which appears at the "0" control port of each stage to deflect the power stream of the respective fluid amplifiers 13 therein to the "0" output channels so that interconnecting ducts 101 through 106 have fluid flowing therein. The fluid from the "0" output channel of stage 84 flows in both ducts 101 and 102. Duct 101 may be connected with another stage or utilization device. Duct 102 supplies an input to 3-way AND junction 107. The "0" output from stage 86 is supplied along duct 103 as one input to 3-way AND 93, 94 and along duct 104 as one input to 3-way AND 108. The "0" output from stage 88 is supplied via duct 105 to 3-way AND 109, and via duct 106 to another stage or utilization device.

Figure 5:
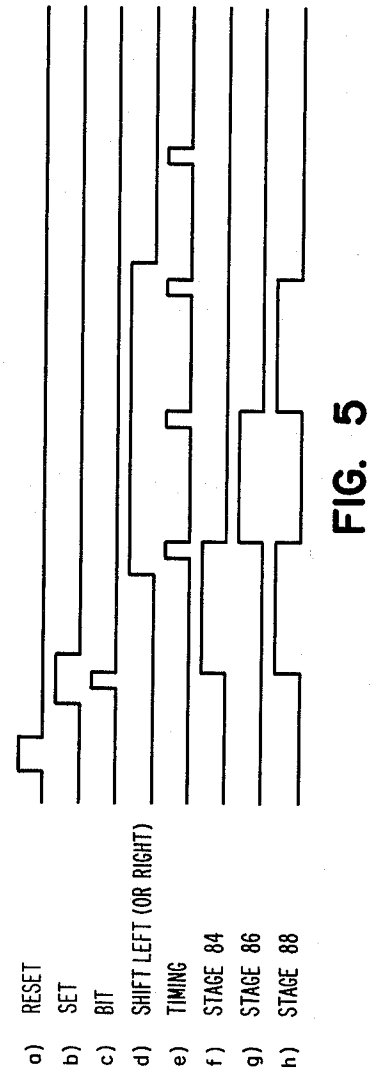
FIGURE 5 is a timing diagram for the bidirectional shift register shown in FIG. 4.

Data bits A, B or C are entered in the respective stages as described above, for example, in parallel and in conjunction with a set pulse supplied on line 110 which appears at 2-way AND junctions 111, 112 and 113. Assuming, for example, data bit ducts "A" and "C" are pulsed with the set pulse (FIGS. 5*b*, 5*c*) the power streams in stages 84 and 88 transfer to their "1" output channels. The flow from stage 84 divides into duct 114 to another stage or utilization device, and into duct 115 to 3-way AND junction 116. The flow from transferred stage 88 is now present in duct 117 to 3-way AND 118 and in duct 119 to another stage or utilization device. The information currently stored at the end of the bit pulses is shown in FIGS. 5*f* and 5*h*.

If it is now assumed that the information is to be shifted to the left, a continuing pressurized fluid stream is supplied via duct 85 at all ducts designated SL, which supply AND junctions 89, 93, 118, 109 and 120. The directional shift signal SL remains present as long as any shifting is required (FIG. 5*d*). Upon the appearance of each timing pulse (FIG. 5*e*) on line 121, information will be shifted one stage to the left. At the time of the first timing pulse, AND junctions 93, 94 are already conditioned by fluid flow in "0" output duct 103 from stage 86 and the SL signal, so that a "0" control pulse switches the power stream from the "1" to "0" output channel. The first timing pulse is also applied simultaneously to passageway 122 so that AND junction 118, conditioned by a "1" stream in duct 117 and the SL signal, provides a "1" control signal to deflect the power stream of stage 86 to the "1" output channel and ducts 123, 124. The first timing pulse also appears at passageway 125 of AND 120 where it combines with the SL signal to produce a control pulse to switch the power stream of stage 88 to the "0" output channel. Stage 84 now has a "0" stored, stage 86 has a "1" stored, and stage 88 has a "0" stored. This condition is illustrated in FIGS. *5e–5h* at the end of the first timing pulse.

The second timing pulse causes stage 84 to indicate a "1" because of the flow in duct 123 and SL pulse combining at AND junctions 89, 90 and the timing pulse in duct 91. Stage 86 transfers to the "0" condition because 3-way AND junction 109 was operated by the combination of the "0" output in duct 105, the SL signal and timing pulse. Stage 88 was already indicating a "0" and does not change when AND 120 is activated. Thus the "1" bit stored originally in stage 88 is now stored in stage 84 after the second timing pulse (FIGS. *5e–5h*). At the end of the third timing pulse all stages are in the "0" condition. The various bits are successively indicated during a left shift by the stream presence in ducts 101 or 114.

A shift right is accomplished by removing the SL signal flow and establishing a stream flow in all ducts designated SR so that AND junctions 126, 116, 107, 127 and 108 are responsive to timing pulses if conditioned by power stream. Stage 88 is the beginning stage in a shift right operation so that AND junction 126 need only be actuated by combining an SR and timing pulse to reset the stage to "0." It is to be noted, however, that in shifting in either direction the timing pulses may be spaced sufficiently to allow a binary bit to be entered at the first stage in serial fashion between the timing pulses.

It has been noted above that the timing pulse is required to end before the power stream issues from the new channel to which it was switched by the pulse from a control port. In order to make the duration of the timing pulses less critical, the downstream ends of the "0" and "1" output channels of each stage may be formed as enlarged chambers interposed between the output channels and the respective ducts connected therewith. The enlarged chamber provides a delay in the effect of the power stream pressure along the duct until the pressure builds up in the chamber.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Information storage apparatus including a source of pressurized fluid shift pulses comprising:

a plurality of cascaded bistable fluid devices with at least one intermediate device, each said device representing one stage of a multi-stage shift register and having a first stable state in which a fluid power stream issues from a first outlet port and a second stable state in which said stream issues from a second outlet port in response to respective first and second fluid control pulses supplied thereto;

first gating means interconnecting the first outlet port of a preceding stage and said source of shift pulses to provide a said first control pulse at said intermediate device upon occurrence of a said shift pulse when said preceding device is in said first state;

second gating means interconnecting the second outlet port of said preceding device and said source of shift pulses to provide a said second control pulse at said intermediate device upon occurrence of a said shift pulse when said preceding device is in said second state;

means connected to each of said devices in said plurality for initially setting selected ones of each of said devices in a predetermined one of said states; and reset means connected to each of said devices for setting each of said devices in a common state.

2. In information storage apparatus having a source of fluid pressure pulses, a shift register comprising:

a plurality of bistable fluid operated devices arranged in cascade and having at least one intermediate device, each said device representing a stage in said shift register and adapted to provide a power stream from a first outlet port in one stable state and from a second outlet port in another stable state in response to respective first and second fluid control signals applied to each said device;

first gating means interconnecting said intermediate device with said pulse source and the first outlet port of a preceding device for providing a said first control signal to said intermediate device when said preceding device is in said one state at the occurrence of one of said pulses;

second gating means interconnecting said intermediate device with said pulse source and the second outlet port of said preceding device for providing a said second control signal to said intermediate device when said preceding device is in said other state at the occurence of one of said pulses; and means connected to the first of said plurality of devices and said source for supplying one of said pulses as a said first control signal to said first device.

3. Apparatus as described in claim 2 further comprising:

means connected to said first device for selectively supplying a said second control signal to set said first device in said second state.

4. Apparatus as described in claim 2 further comprising:

means connected to each of said devices in said plurality for directing fluid pulses each representative of information bits as second control signals for selectively setting said devices in said second stable states.

5. In information storage apparatus having a source of fluid pressure pulses, a shift register comprising:

a series of bistable fluid-operated devices arranged in cascade, each said device representing one stage in said shift register and adapted to issue a fluid power stream from a first outlet port in one stable state and from a second outlet port in a second stable state in response to fluid control signals supplied thereto by respective first and second control nozzles;

reset means connected to each of said first nozzles for directing fluid control signals thereto for initially setting each of said devices in said first stable state;

setting means connected to each of second nozzles for directing fluid control signals thereto setting selected ones of said devices in said second stable state;

a first coincidence gating means connected to each of said first nozzles conjointly with said reset means except for the first of said series of devices, each interconnected with said first outlet port of an adjacent device and said pulse source for alternatively providing control signals to said first nozzles when said adjacent device is in said first state at the occurrence of a pulse at said source; and a second coincidence gating means connected to each of said second nozzles conjointly with said setting means except for the first of said series of devices, each interconnected with said second outlet port of said adjacent device and said pulse source for alternatively providing control signals to said second nozzles when said adjacent device is in said second state at the occurrence of a pulse at said source.

6. In information storage apparatus having a source of fluid pressure pulses, a bi-directional shift register comprising:

a plurality of bistable fluid operated devices arranged in cascade and having at least one device intermediate the end devices of said plurality, each said device being one stage in said shift register and providing a fluid power stream from a first outlet port in one stable state and from a second outlet port in another stable state in response to first and second fluid control signals, each said state being representative of binary information;

means selectively operable to provide first fluid shift signals for transferring said information in one direction from one adjacent device to said intermediate device and to provide second fluid shift signals for transferring said information in an opposite direction from the other adjacent device to said intermediate device;

first gating means interconnecting said first ports of said adjacent devices with said shift signal means and said timing pulse source for providing a said first control signal to said intermediate device upon coincidence of a said power stream in the first port of said one adjacent device and a said timing pulse with said first shift signal, and upon coincidence of a said power stream from the first port of said other adjacent device and a said timing pulse with said second shift signal; and second gating means interconnecting said second ports of said adjacent devices with said shift signal means and said timing pulse source for providing a said second control signal to said intermediate device upon the coincidence of a said power stream in the second port of said one adjacent device and a said timing pulse with said first shift signal and upon the coincidence of a said power stream from the second port of said other adjacent device and a said timing pulse with said second shift signal.

7. In information storage apparatus having a source of pressurized fluid timing pulses, a bi-directional shift register comprising:

a plurality of bistable fluid operated devices arranged in cascade and having at least one device intermediate the end devices of said plurality, each said device representing one stage in said shift register and adapted to provide a fluid power stream from a first outlet port as a manifestation of a binary "0" in one stable state, and from a second outlet port as a manifestation of a binary "1" in another stable state in response to respective first and second fluid control signals applied thereto;

means selectively controllable for providing a first fluid shift signal for transferring information stored in said devices in a forward direction through said cascaded devices, and a second fluid shift signal for transferring information stored in said devices in a reverse direction through said cascaded devices;

first gating means interconnected with said source of timing pulses, said first shift signal, and the first port of a preceding device in said series for generating a said first control signal at said intermediate device for information transfer in said forward direction upon the coincidence of a said timing pulse and said first shift signal with said preceding device in said first state;

second gating means interconnected with said source of timing pulses, said first shift signal and the second port of said preceding device for generating a said second control signal at said intermediate device for information transfer in said forward direction upon the coincidence of a said timing pulse and said first shift signal with said preceding device in said second state;

third gating means interconnected with said source of timing pulses, said second shift signal, and the first port of a succeeding device in said series for generating a first control signal at said intermediate device for information transfer in said reverse direction upon coincidence of a said timing pulse and said second shift signal with said succeeding device in said first state; and fourth gating means interconnected with said source of timing pulses, said second shift signal, and the second port of said succeeding device for generating a said second control signal at said intermediate device for information transfer in said reverse direction upon the coincidence of a said timing pulse and said second shift signal with said succeeding device in said second state.

References Cited by the Examiner

UNITED STATES PATENTS 3,010,649 11/1961 Glattli ---------------- 235—201

OTHER REFERENCES

Mitchell: Fluid Matrix, IBM Technical Disclosure Bulletin, vol. 6, No. 2, July 1963, page 31.

Wood et al.: Fluid Computers, International Science and Technology, pages 44–52, November 1963. (Rec'd in Scientific Library 10–28–63.)

Shin: "No Moving Parts Needed!" SAE Journal, August 1963, pages 38–43.

Mitchell et al.: "Fluid Logic Devices," Fluid Power International, vol. 28, No. 328, July 1963, pages 243–247.

General Electric Co. Phase 1 Report, Fluid Amplifier State of the Art, vol. I, December 3, 1963, pages 6–2, 6–10 to 6–16 (assemblies) relied on.

References Cited by the Applicant

UNITED STATES PATENTS 3,001,698 9/1961 Warren.

LOUIS J. CAPOZI, *Primary Examiner.*

LEO SMILOW, *Examiner.*

W. F. BAUER, *Assistant Examiner.*